United States Patent
Poole (10) Patent No.: US 7,116,870 B2
(45) Date of Patent: Oct. 3, 2006

(54) BROADBAND FIBER OPTIC TAP

(75) Inventor: Craig D. Poole, Durham, NH (US)

(73) Assignee: Eigenlight Corporation, Somersworth, NH (US)

( * ) Notice: Subject to any disclaimer, the term of this patent is extended or adjusted under 35 U.S.C. 154(b) by 0 days.

(21) Appl. No.: 11/216,502

(22) Filed: Aug. 31, 2005

(65) Prior Publication Data

US 2006/0045426 A1    Mar. 2, 2006

Related U.S. Application Data

(60) Provisional application No. 60/606,002, filed on Aug. 31, 2004.

(51) Int. Cl.
*G02B 6/26* (2006.01)
*G02B 6/14* (2006.01)

(52) U.S. Cl. .............................. 385/48; 385/28; 385/39

(58) Field of Classification Search .................. 385/27, 385/28, 39, 47, 48
See application file for complete search history.

(56) References Cited

U.S. PATENT DOCUMENTS

| | | | |
|---|---|---|---|
| 3,931,518 A | 1/1976 | Miller | 250/227.24 |
| 4,832,437 A * | 5/1989 | Kim et al. | 385/1 |
| 5,315,675 A | 5/1994 | Dennis et al. | 385/32 |
| 5,411,566 A | 5/1995 | Poole et al. | 65/402 |
| 5,432,876 A * | 7/1995 | Appeldorn et al. | 385/31 |
| 5,500,913 A | 3/1996 | Allen et al. | 385/48 |
| 6,535,671 B1 | 3/2003 | Poole | 385/48 |
| 2004/0258357 A1 * | 12/2004 | De Barros et al. | 385/37 |

OTHER PUBLICATIONS

H. Grebel et al., "Effect of periodic strain on the leaky modes in single-mode fiber", *Applied Optics*, vol. 27, No. 23, Dec. 1, 1988, pp. 4819-4821.

* cited by examiner

*Primary Examiner*—John D. Lee
(74) *Attorney, Agent, or Firm*—Michaelson & Associates; Peter L. Michaelson (57) ABSTRACT

A broadband optical fiber tap for transferring optical energy out of an optical fiber having an optical fiber with a primary and secondary microbends for the purpose of coupling optical energy into the higher-order modes of the fiber, and a reflecting surface formed in the cladding of the fiber and positioned at an angle so as to reflect, by total internal reflection, higher-order mode energy away from the optical fiber. In the preferred embodiment, the two microbends are spaced apart by a distance approximately equal to one-half of the intermodal beat length for LP01 and LP11 modes of a single-mode fiber.

8 Claims, 13 Drawing Sheets

BROADBAND FIBER OPTIC TAP

CLAIM TO PRIORITY

This application claims priority of co-pending U.S. provisional application entitled "Broadband Fiber Optic Tap", filed Aug. 31, 2004 and accorded Ser. No. 60/606,002; which is incorporated by reference herein.

BACKGROUND OF THE INVENTION

1. Field of the Invention

This invention relates to a component for coupling optical energy out of an optical fiber, and particularly to an optical fiber tap that efficiently couples optical energy out over a relatively broad wavelength range.

2. Description of the Prior Art

The ever-increasing complexity of fiber optic networks has created a need for devices that can measure the optical energy flowing through an optical fiber. Such devices are useful for network monitoring and control purposes, in many ways analogous to water gauges used to monitor the flow of water through pipes.

In order to measure the flow of optical energy in an optical fiber, a small fraction of the optical energy must be redirected out of the fiber and onto a detector. The detector converts the optical energy into an electrical signal that serves as a representation of the optical energy flowing in the fiber. A device commonly referred to as an "optical tap" performs the function of removing a fraction of optical energy from an optical fiber.

A variety of techniques for tapping light out of an optical fiber are well-known in the art. One such technique is described in U.S. patent application Ser. No. 10/390,398 ("the '398 application"), in which a $CO_2$ laser beam is used to create a two-part structure in a fiber comprised of an annealed microbend and a reflecting surface formed in the cladding of the fiber for directing the light scattered by the microbend out of the side of the fiber.

While this technique offers many desirable features, such as small size, low insertion loss, and ease of manufacture, it suffers from inherent wavelength dependence owing to the guiding properties of the fiber.

One measure of this wavelength dependence is a variation with wavelength of tap efficiency. The tap efficiency is defined as a ratio of the optical power tapped out to the total optical power that is lost by introducing the tap into the optical path. Efficiency is reduced when light is scattered out of a fiber core but fails to exit the fiber at the tap and instead is lost at points downstream of the tap.

Unfortunately, in optical taps made in conventional telecommunications fiber according to the teachings of the '398 application, the tap efficiency may vary by as much as 400% over the wavelength band from 1310 nm to 1550 nm. While wavelength dependence may be of little, if any, concern for narrow-band applications, broadband applications require that the tap efficiency remain relatively constant over the 1310 nm to 1550 nm wavelength region.

SUMMARY OF THE INVENTION

Advantageously, the present invention provides an optical tap that is relatively insensitive to wavelength and thus allows operation over a relatively broad wavelength range.

In accordance with the present inventive teachings, the present invention accomplishes this through a single-mode fiber with two annealed microbends formed in the fiber, using, e.g., $CO_2$ laser radiation, and a reflecting surface formed in the cladding downstream of the two microbends. The reflecting surface is formed using the same $CO_2$ laser used to form the microbends by using laser ablation to create a notch in the cladding of the fiber. The notch is formed in the cladding of the fiber so as to create a reflecting surface at an angle of approximately 44 degrees to the perpendicular of the fiber axis, thus inducing total internal reflection for light incident on the surface. The two microbends are spaced apart by a distance approximately equal to one-half of the intermodal beat length for the LP01 and LP11 modes so as to cause anti-resonant coupling. Anti-resonant coupling reduces the relative amount of light in the LP11 mode while populating higher-order modes that are coupled out more efficiently, thus greatly reducing the wavelength dependence of the tap and hence greatly expanding its wavelength range.

BRIEF DESCRIPTION OF THE DRAWINGS

The teachings of the present invention can be readily understood by considering the following detailed description in conjunction with the accompanying drawings in which.

To facilitate reader understanding, identical reference numerals are used to denote identical or similar elements that are common to various figures. The drawings are not necessarily drawn to scale.

DETAILED DESCRIPTION OF THE PREFERRED EMBODIMENT

Figure 1:
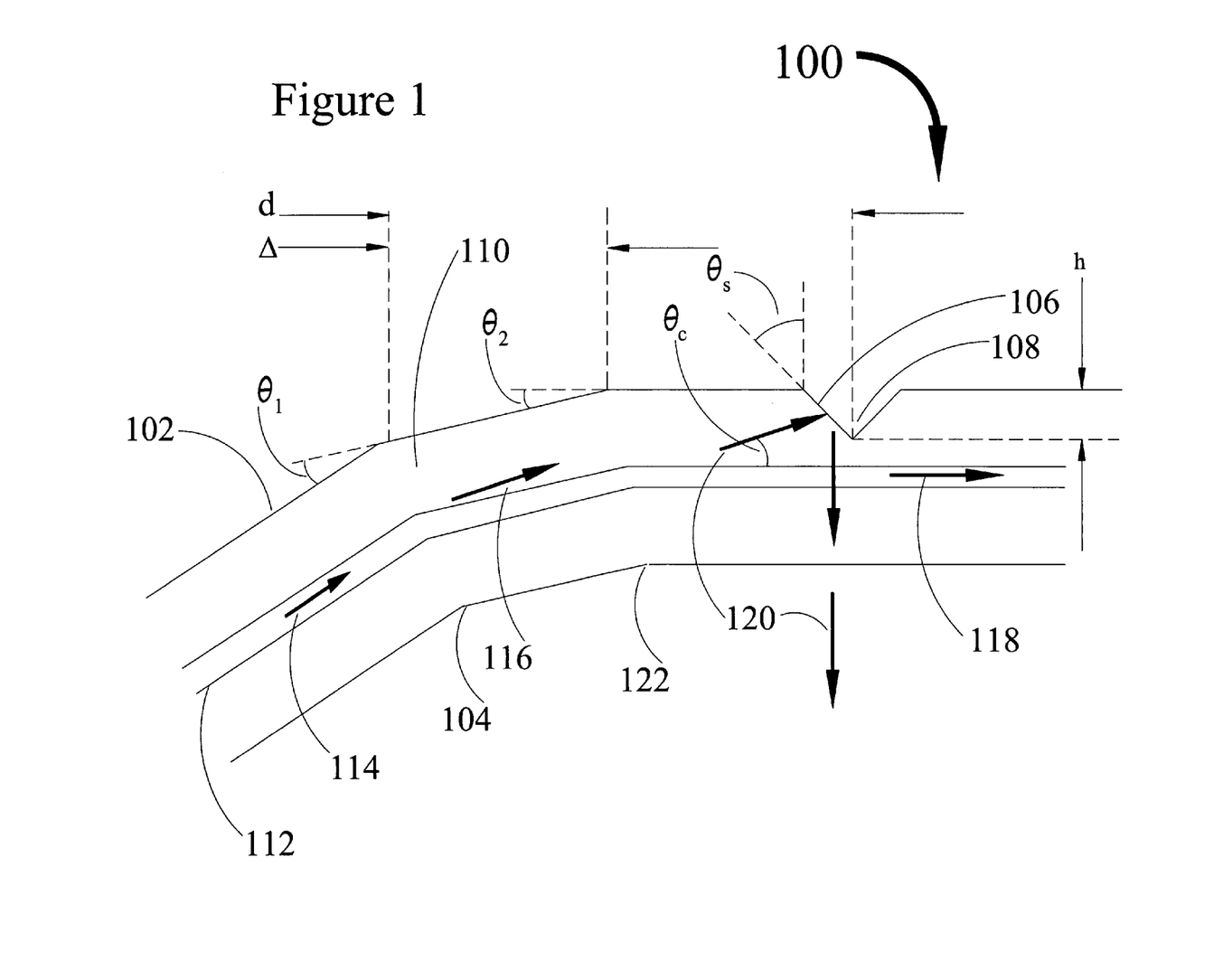
FIG. 1 depicts a side view of an embodiment of inventive optical fiber tap 100.

Referring to the drawings, FIG. 1 depicts fiber optic tap 100 comprising optical fiber 102, primary microbend 104, secondary microbend 122 and reflecting surface 106. Reflecting surface 106 and microbends 104 and 122 are formed using radiation from a single $CO_2$ laser as described below. Hereinafter a microbend refers to a bent section of fiber having a radius of curvature comparable to the diameter of the fiber. In contrast, a macrobend refers to a bend having a radius of curvature that is relatively large compared to the diameter of the fiber. In the preferred embodiment, microbends 104 and 122 are annealed microbends, meaning they are formed in the fiber by locally heating the fiber above its softening temperature. Microbends 104 and 122 are thus permanent, stress-free structures in the fiber.

As described in more detail below, microbends 104 and 122 serve to scatter optical energy out of a core of fiber 102 into its cladding. The scattered energy is reflected out of a side of fiber 102 by reflecting surface 106. Preferably, reflecting surface 106 is formed at an angle $\theta_s$ as shown in FIG. 1, where $\theta_s$ is greater than or equal to an angle for total internal reflection. As is well known in the art, the angle for total internal reflection $\theta_t$ is determined by a refractive index $n_{clad}$ of fiber cladding 110 and a refractive index $n_s$ of a medium surrounding fiber 102 and is expressed by the formula $\theta_t = \arcsin(n_s/n_{clad})$. For example, for an optical fiber with undoped silica cladding surrounded by air, the angle $\theta_t$ for total internal reflection is approximately 44 degrees. Thus, assuming scattering angle $\theta_c$ is small, angle $\theta_s$ should be formed to have an angle greater than or equal to approximately 44 degrees.

Additionally, in the preferred embodiment reflecting surface 106 is located downstream of primary microbend 104 a distance d, in a direction of optical propagation through fiber 102, sufficient to allow energy 120 to expand out to the outer wall of cladding 110, but not so far that energy 120 can escape out of the side of fiber 102 before encountering reflecting surface 106. For small bend angles $\theta_1$ and $\theta_2$, the preferred distance falls in the range of $$(n_{clad} D)/NA < d < (2 n_{clad} D)/NA \qquad (1)$$

where $n_{clad}$ is the index of refraction of the cladding glass, D is the fiber diameter, and NA is the numerical aperture of the fiber. For conventional telecommunications fiber having NA of 0.14, cladding index of refraction 1.45, and diameter 125 micron, reflecting surface 106 should be located between 1.3 mm and 2.6 mm from primary microbend 104.

When compared to a tap comprised of a single microbend as described in U.S. patent application Ser. No. 10/390,398 ("the '398 application"), the inventive tap 100 of FIG. 1 may be made to exhibit improved wavelength performance and efficiency by controlling the bending angles $\theta_1$ and $\theta_2$ of the two microbends, the spacing $\Delta$ between the microbends, and the depth h and position d of reflecting surface 106. As described in more detail below, the spacing between microbends 104 and 122 is approximately and preferably equal to one-half the intermodal beat length for the LP01 and LP11 modes.

Figure 2:
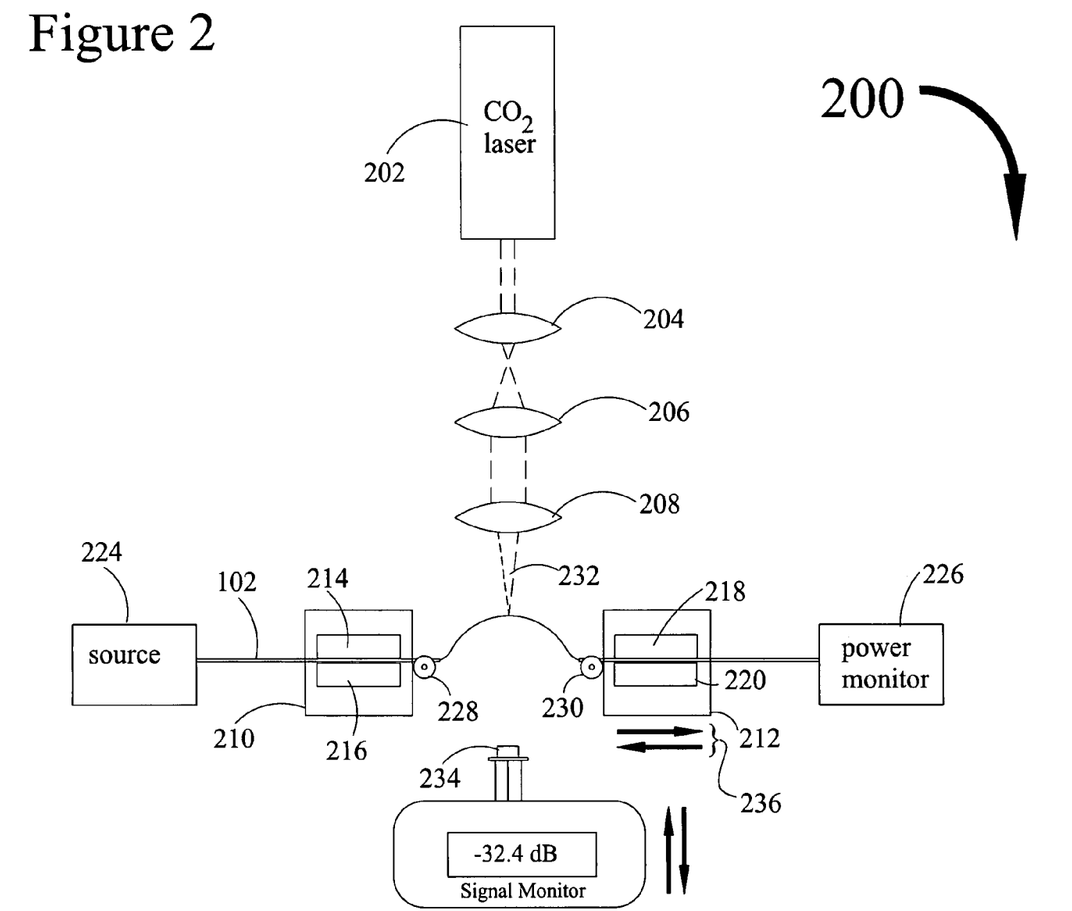
FIG. 2 depicts a block diagram of apparatus 200 for fabricating the optical fiber tap shown in FIG. 1.

The apparatus used to make optical tap 100 is shown in FIG. 2 and is similar to that described in the '398 application. Radiation from $CO_2$ laser 202 is directed through lenses 204, 206 and 208 which collectively condition and focus the laser radiation onto optical fiber 102. Optical fiber 102 is held in focused beam 232 by clamping fixtures 210 and 212, each of which holds the fiber by sandwiching it between clamping plates 214 and 216, and 218 and 220, respectively. A clamping force applied to fiber 102 by clamping fixtures 210 and 212 is adjusted so as to avoid inducing loss in the fiber while maintaining sufficient force to hold the fiber in place.

Prior to mounting in the clamping fixtures, optical fiber 102 has a portion of its protective jacket removed to expose a length of bare cladding. The exposed cladding section is then positioned in the region between clamping fixtures 210 and 212.

Optical power from secondary laser source 224 is coupled into fiber 102 while power meter 226 measures an amount of optical power emerging from fiber 102.

After mounting fiber 102 in clamping fixtures 210 and 212, and prior to applying radiation from $CO_2$ laser 202, fiber 102 is flexed to form a macrobend by moving clamping fixture 212 toward clamping fixture 210. Fiber guides 228 and 230 cause the fiber to bend in the direction of the laser radiation. Preferably, the macrobend induced in fiber 102 should be of sufficiently small radius to provide stress in the fiber that is greater than any residual stress caused by accidental twists or flexing of the fiber in the clamping fixtures, while at the same time minimizing excess loss in the fiber. For example, a bend radius of approximately 0.5 inches usually satisfies this condition for a Corning SMF-28 single-mode fiber.

Focused radiation from $CO_2$ laser 202 is applied to the bent section of fiber 102 while optical power is measured by power meter 226. Through absorption of the optical energy from $CO_2$ laser 202, glass of fiber 102 is heated above its softening temperature forming permanent microbend 104 (see FIG. 1) in the fiber. By adjusting laser beam parameters produced by laser 202 such as focal spot size, power level, and time of exposure, the microbend that is formed can be made to scatter a predetermined fraction of optical power from the core of fiber 102 into the cladding as measured by the change in transmitted power using power meter 226. Preferably, the focal spot size should be adjusted to be comparable to a diameter of the fiber to minimize an extent of an affected region on the fiber and keep the induced microbend radius as small as possible. In this way multi-path affects are avoided that otherwise could lead to polarization dependence in the tap. For example, using a focal spot size of 400 micron, a power level of 3.5 Watt from a $CO_2$ laser operating at 10.6 micron wavelength induces a 0.5 dB loss in Corning SMF-28 single-mode fiber held in a 0.5 inch radius bend in 1 second of exposure. By actively monitoring the loss induced by microbend 104 during formation, the amount of bending can be controlled without the need for direct measurement of angle $\theta_1$ of FIG. 1.

After forming microbend 104, fiber 102 is translated a distance $\Delta$, in the direction shown by arrow 236, and generally to left, by moving clamping fixtures 210 and 212 in unison. Secondary microbend 122 is then formed following the same procedure and exposure time as for primary microbend 104.

After forming secondary microbend 122, clamping fixture 212 is moved back to its starting position to release the stress in fiber 102. Using clamping fixtures 210 and 212, fiber 102 is then moved to position such that the laser beam from laser 202 is focused onto a point on fiber 102 a distance d from primary microbend 104 in the direction away from source 224. Lenses 206 and 208 are then moved to readjust the size of the focus. Laser radiation is applied to fiber 102 to form notch 108 by pulsing the laser at a predetermined rate while moving fiber 102 through the focal region. To form a v-shaped notch in the cladding of fiber 102, the laser power level, focal spot size and pulse duration are adjusted so that the temperature of the cladding glass of fiber 102 is raised above the temperature required to vaporize the glass material in a small region. After forming the notch, the optical power reflected out of the side of the fiber is measured using photodetector 234.

In order to minimize excessive melting of a region surrounding the notch and thus avoid excess loss caused by distortion of the fiber core, large peak power density levels and short duration pulses should be used. For example, "Laser-fabricated fiber-optic taps", by K. Imen et al, OPTICS LETTERS, Vol. 15, No. 17, Sep. 1, 1990, pp. 950–952, states that a pulse duration of greater than 10 msec can induce noticeable melting of the region surrounding a laser machined notch in multi-mode fiber. In single-mode fiber, where even small amounts of melting of the core can induce measurable losses, it is preferable to maintain pulse duration below 1 msec.

For the results reported here, a $CO_2$ laser having 100-Watt peak power, pulse duration of 50 microseconds, focal spot size of approximately 50 micron and power density at the surface of the fiber of approximately 5 million Watts/cm² was used to form notch 108 of FIG. 1. In order to obtain the desired angle for reflecting surface 106 of FIG. 1, the laser was pulsed at approximately 1 pulse per second while traversing fiber 102 across the beam at a rate of approximately 12 micron per second. With this scan rate and pulse rate, approximately 10 pulses impacted the fiber on each pass. It should be noted that the process for forming optical tap 100 can be readily adapted to a fully automated manufacturing process in which taps are formed at multiple points along the length of a single fiber. By manufacturing multiple taps in a single fiber span, ensuing cost of manufacture can be greatly reduced by avoiding a need to terminate fiber ends for each tap.

Returning to tap 100 of FIG. 1, optical fiber 102 is assumed to comprise central core 112 of refractive index $n_{core}$ surrounded by cladding 110 having a lower refractive index $n_{clad}$. In some embodiments, either or both the core and cladding may have refractive index profiles of varying complexity and shape. Further, it is assumed that optical energy 114 flowing in optical fiber 102 is in a guided mode of the fiber prior to entering optical tap 100. As is well known in the art, light is said to be in a guided mode when radial distribution of its energy remains fixed as the light propagates along a length of an optical fiber. The majority of optical energy of such guided modes is also typically located within a higher-index core region of an optical fiber. By contrast, light is said to be in an unguided mode of an optical fiber when its radial distribution of energy changes as it propagates along the length of a fiber. In addition, light that is unguided typically has a majority of its optical energy in the lower index cladding that surrounds the core. In the preferred embodiment, optical fiber 102 is a step-index, single-mode fiber. Such fibers guide only the LP01 mode. Higher-order modes such as the LP11, LP02, etc. are unguided, although they may propagate for distances of millimeters or more in the fiber before losing their energy through radiative decay.

In order to better understand the operation of optical tap 100 of FIG. 1, and its advantages over prior art, it is useful to represent tap 100 by a diagram that shows the distribution of optical energy among the modes of fiber 102 as a function of position along the fiber. Such a diagram is commonly referred to as a level diagram.

Figure 3:
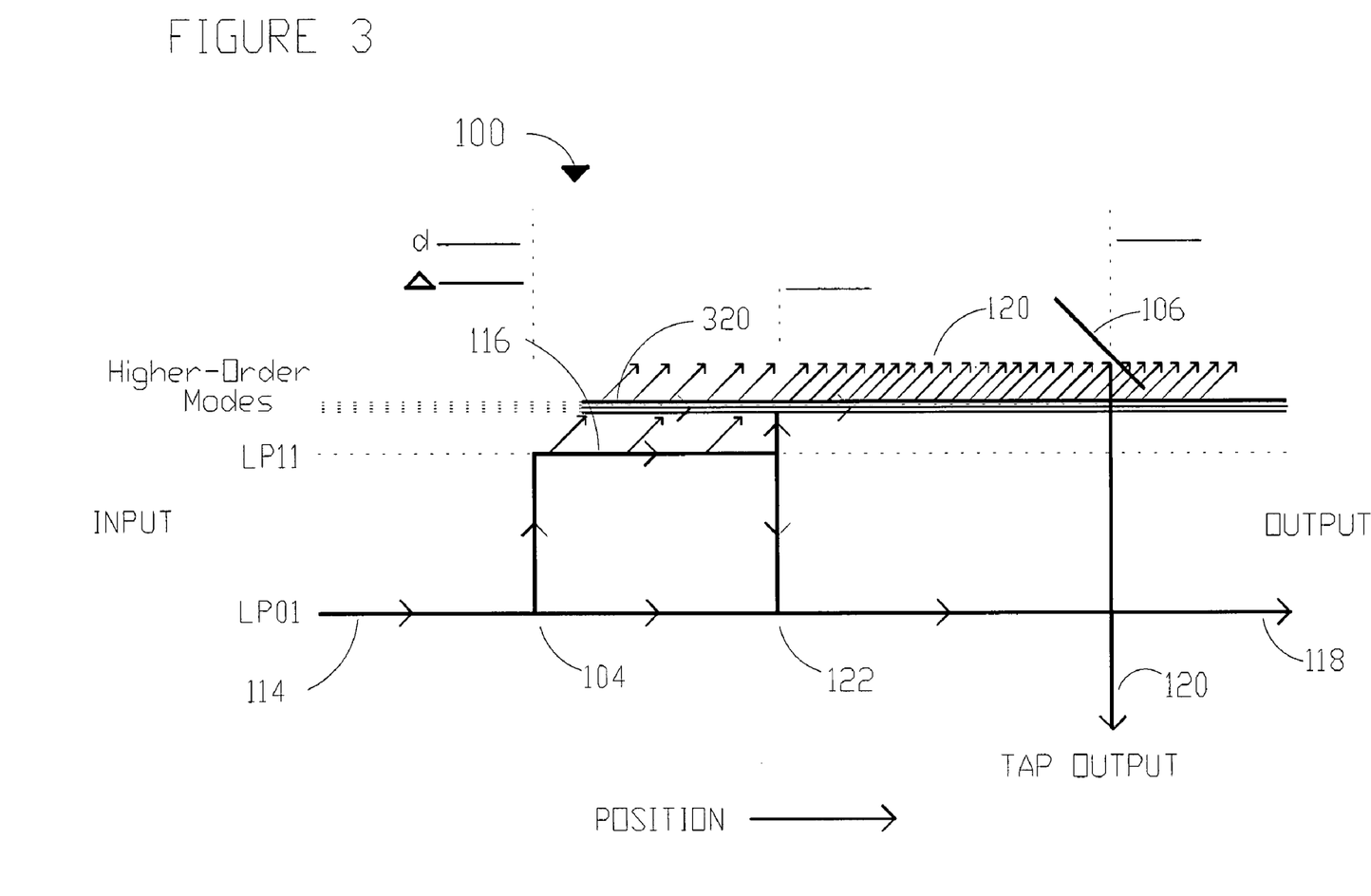
FIG. 3 depicts a level diagram representing the transfer of energy between fiber modes as a function of position for the tap of FIG. 1.

FIG. 3 shows a level diagram for tap 100 of FIG. 1. The horizontal lines represent modes (i.e., "levels") of the fiber that are either empty (dashed line) or filled (solid line). The arrows indicate movement of optical energy. Position in the fiber is represented by horizontal position in the diagram.

As shown in FIG. 3, input optical energy 114 enters tap 100 in the lowest-order LP01 mode. Since this is a guided mode, energy 114 remains in that mode until it encounters primary microbend 104. A small amount of energy is coupled into the LP11 mode by microbend 104. The coupling-strength of microbend 104 refers to the relative amount of energy transferred to the LP11 mode and increases with angle $\theta_1$ of FIG. 1. For the description given here, the power coupled to modes of order higher than LP11 by primary microbend 104 are assumed to be negligible. As is well-known in the art, microbends tend to couple the LP01 to the LP11 mode much more efficiently than to other modes.

Since the LP11 mode is not a guided mode, LP11 mode energy 116 radiates into higher-order modes and into the cladding as it propagates down the fiber. The higher-order modes in turn, radiate energy away into the cladding of fiber 102.

When LP11 mode energy 116 encounters secondary microbend 122, energy is split into three portions. One portion is coupled into higher-order modes. A second portion is coupled back into guided LP01 mode and a third portion remains in the LP11 mode. The amount of optical energy in each of these portions after secondary bend 122 is determined by the coupling-strength of microbends 104 and 122, and by the relative phase of the LP01 and LP11 modes at microbend 122. Since, as is well known in the art, the LP01 and LP11 modes have differing phase velocities, the spacing between microbends 104 and 122 determines the relative phase of the modes at microbend 122.

Downstream of microbends 104 and 122, energy 120 radiated into the cladding by unguided LP11 mode energy 116 and higher-order mode energy 320, impinges on reflecting surface 106 and exits tap 100 as tap output energy 120. The efficiency of tap 100 depends on the efficiency with which optical energy is radiated into the cladding of fiber 102 and is thus captured by reflecting surface 106. Optical energy that remains in the unguided modes or in the cladding that is not captured by reflecting surface 106 is radiated out of fiber 102 further downstream of tap 100. This "lost" energy reduces the efficiency of tap 100 and is thus undesirable.

According to the present inventive teachings, if the coupling-strengths of microbends 104 and 122 are made approximately equal and the inter-microbend spacing is adjusted to produce a 180 degree phase difference between LPO1 and LP11 modes at microbend 122, then the amount of energy in the LP11 mode after microbend 122 is approximately zero. Such coupling is referred to as anti-resonant coupling. To achieve a totally anti-resonant coupling, the spacing between microbends 104 and 122 needs to be equal to one-half the intermodal beat length for the LPO1 and LP11 modes, the beat-length $L_B$ being defined as $$L_B = \lambda/\Delta n \qquad (2)$$

where $\lambda$ is the wavelength of light, and $\Delta n$ is the effective index difference between the LPO1 and LP11 modes. In step-index fibers operated above the LP11 mode cut-off wavelength, the index difference $\Delta n$ is given approximately by $$\Delta n = b_{01}* (n_{core} - n_{clad}) \qquad (3)$$

where $n_{core}$ and $n_{clad}$ are the refractive indices of the core and cladding, and $b_{01}$ is a well-known normalized propagation constant for the LP01 mode (see for example, Chapter 3, "Guiding Properties of Fibers", by D. Marcuse, et al of Optical Fiber Telecommunications (Edited by S. E. Miller and A. G. Chynoweth, Academic Press, Inc., Boston, Mass. ©1979, pp. 37–45)) (the "Marcuse text").

A consequence of eliminating most, if not all, of the LP11 mode energy through the anti-resonant coupling is that tap 100 may be made more efficient since the higher-order modes generally radiate more readily into the cladding than the LP11 mode. This effect is particularly true for wavelengths that are close to the cut-off wavelength for the LP11 mode. At these wavelengths, the LP11 mode, although unguided, can still propagate for long distances in the fiber without giving up its energy to the cladding.

A tap that utilizes a single bend as described in the '398 application, relies solely on the LP11 mode to radiate energy into the fiber cladding. As a result, such taps show reduced efficiency near the cut-off wavelength and thus increased wavelength dependence compared to tap 100 of FIG. 1.

Figure 4:
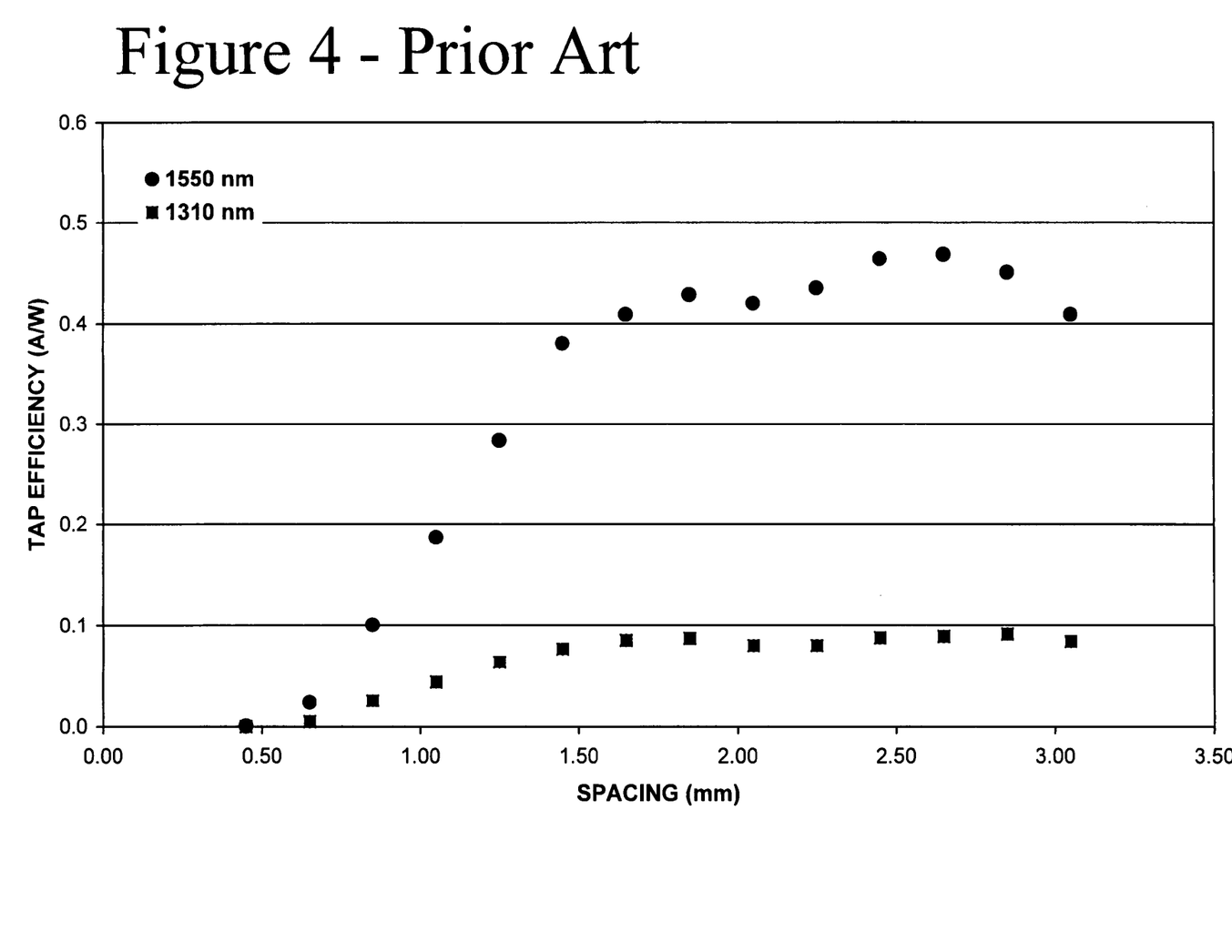
FIG. 4 depicts a graph of tap efficiency plotted as a function of spacing between microbend and reflecting surface for a conventional single-bend optical fiber tap.

FIG. 4 shows a plot of tap efficiency as a function of distance between microbend and reflecting surface in a series of single-bend taps made according to the teachings of the '398 application. The normalized tap efficiency plotted in the figure is the ratio of photocurrent generated by detector 234 of FIG. 2 divided by the optical power measured by power meter 226 and divided by the total fractional loss of the tap. Data for both 1310 nm and 1550 nm are shown. The taps were formed by inducing a microbend having loss of 0.20 dB at 1550 nm in Corning SMF28 single-mode fiber. The corresponding loss at 1310 nm was measured to be 0.17 dB. The fiber had a cut-off wavelength of approximately 1260 nm and a core-cladding index step of 0.0025. Cutting a notch into the cladding to a depth of approximately 34 micron formed the reflecting surface 106 for each tap.

FIG. 4 shows that as the spacing between the microbend and reflecting surface becomes small, the tap efficiency approaches zero since the optical power coupled out of the core by the microbend has not radiated out into the cladding and therefore is not collected by the reflecting surface. At spacing greater than 1.5 mm, the data for both wavelengths plateaus, with a significantly lesser efficiency for the 1310 nm data. Because the 1310 nm wavelength is much closer to the cut-off wavelength for the LP11 mode than the 1550 nm wavelength, the LP11 mode power does not radiate as readily at 1310 nm resulting in a factor of 5 reduction in efficiency for this wavelength.

Figure 5:
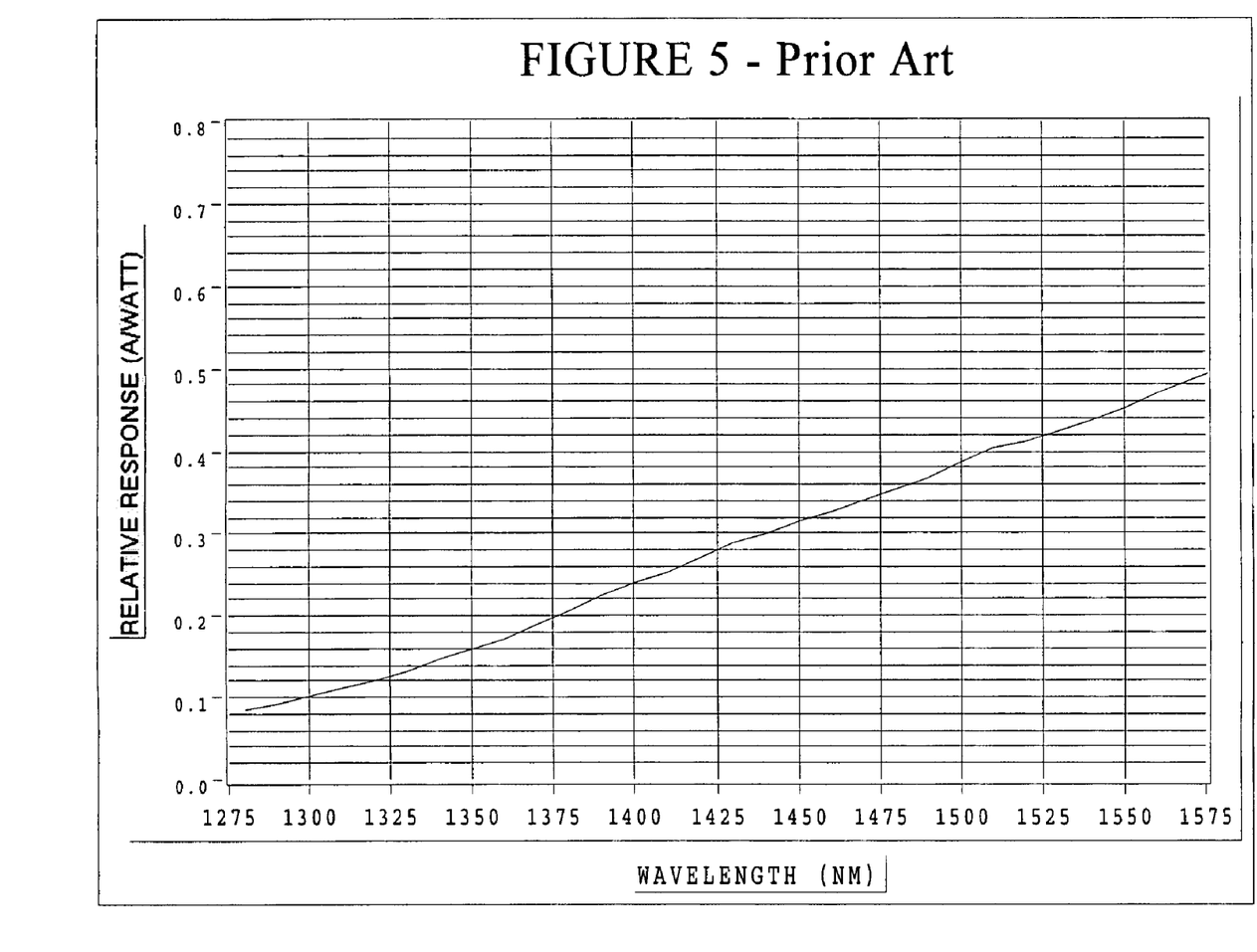
FIG. 5 depicts a graph of tap output signal plotted as a function of wavelength for a conventional single-bend optical fiber tap.

FIG. 5 shows the wavelength dependence of a similar single-bend tap made according to the teachings of the '398 application. The reflecting surface was positioned 1.6 mm downstream of the microbend. The relative response shows a marked dependence on wavelength over the entire wavelength interval from 1275 nm to 1575 nm, with the wavelengths close to cut-off showing greatly reduced efficiency.

To demonstrate the benefits achieved using a secondary microbend in the inventive tap of FIG. 1, the intermodal beat length between the LP01 and LP11 modes was measured in a sample of Corning SMF28 single-mode fiber. The beat length was determined by measuring the wavelength dependent loss in the fiber while pressing the fiber between corrugated plates of varying periodicity, in a manner similar to that described in "Two-mode fiber modal coupler", by R. C. Youngquist et al, *OPTICS LETTERS*, Vol. 9, No. 5, 1984, pp. 177–179.

Figure 6:
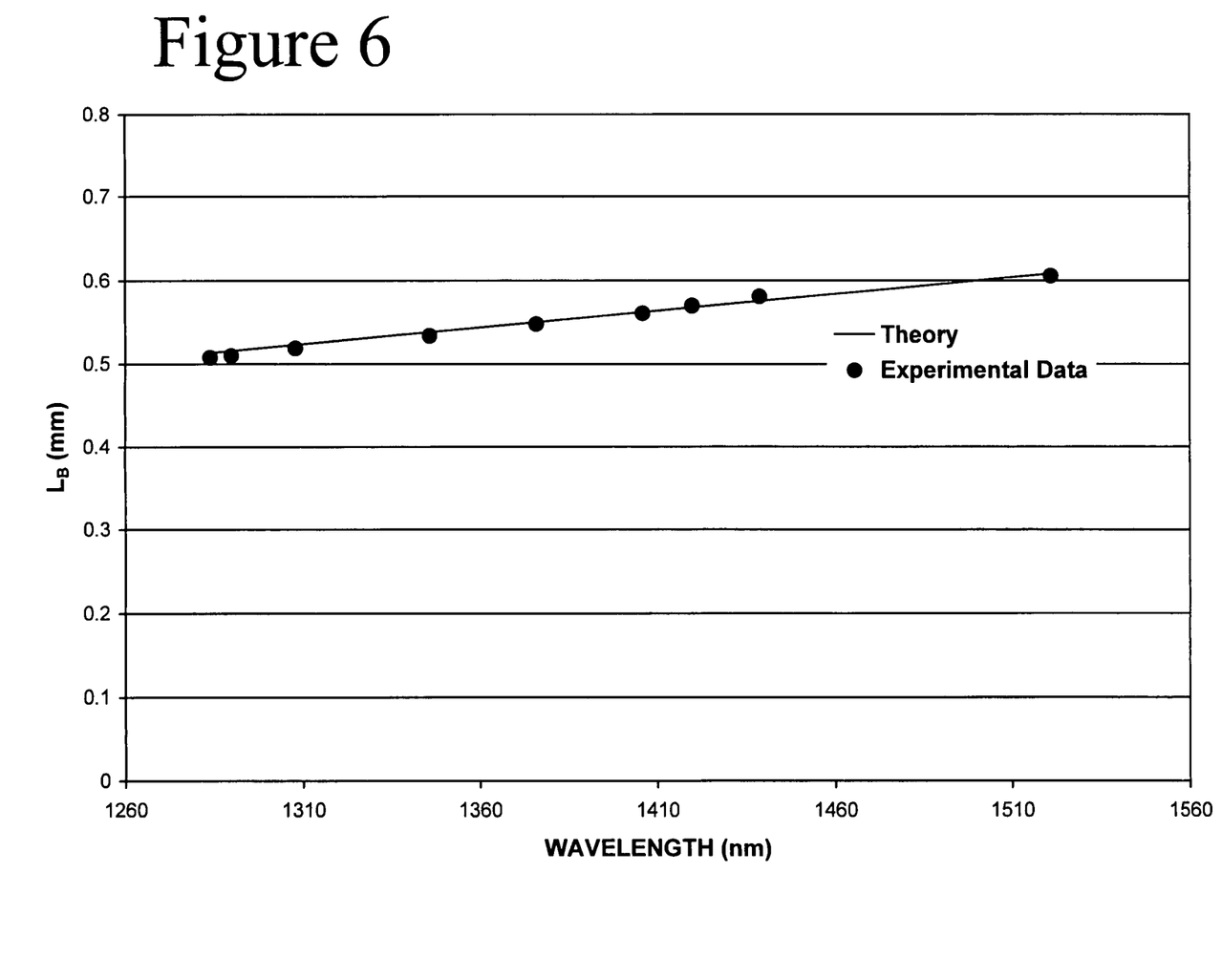
FIG. 6 depicts a graph of intermodal beat length for the LP01 and LP11 modes plotted as a function of wavelength in a conventional single-mode fiber.

FIG. 6 shows a plot of measured beat length as a function of wavelength. The theoretical curve in the figure was generated using Eqs. (2) and (3) above, the known core-cladding index difference of 0.0025, and a value for the normalized propagation constant $b_{01}$ of 0.48. The latter value was obtained from the data plotted in Chapter 3 of the Marcuse text, p. 43 and assuming a V-number of 2.2.

Tap efficiency and insertion loss were measured as a function of separation Δ between microbends 104 and 122 of FIG. 1 by fabricating a series of taps in Corning SMF28 fiber. The notch-depth was 34 microns and distance d between the primary microbend and reflecting surface 106 was 1.8 mm for all of the taps.

Figure 7:
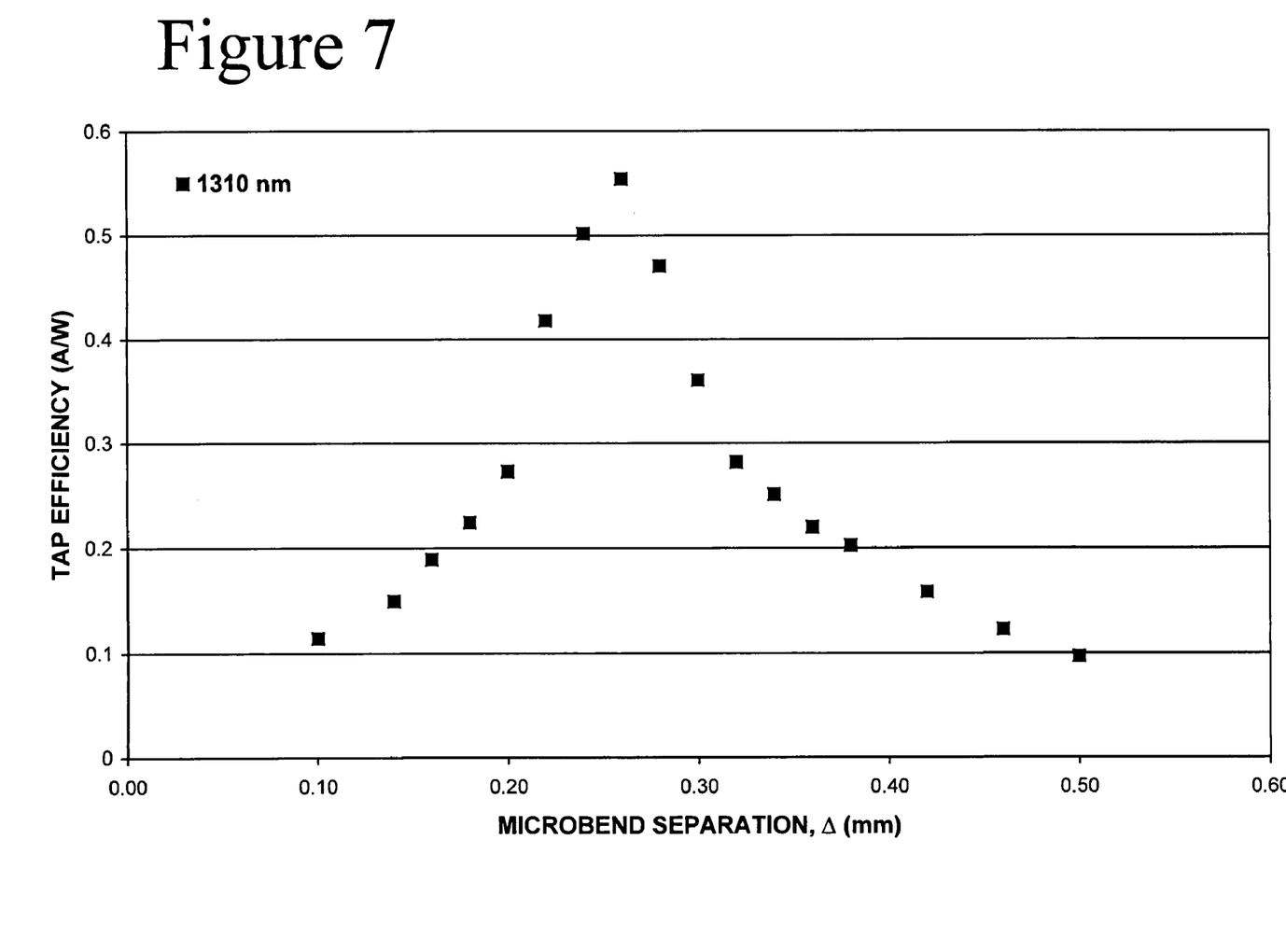
FIG. 7 depicts a graph of tap efficiency plotted as a function of separation between microbends at a wavelength of 1310 nm for the fiber optic tap of FIG. 1.
Figure 8:
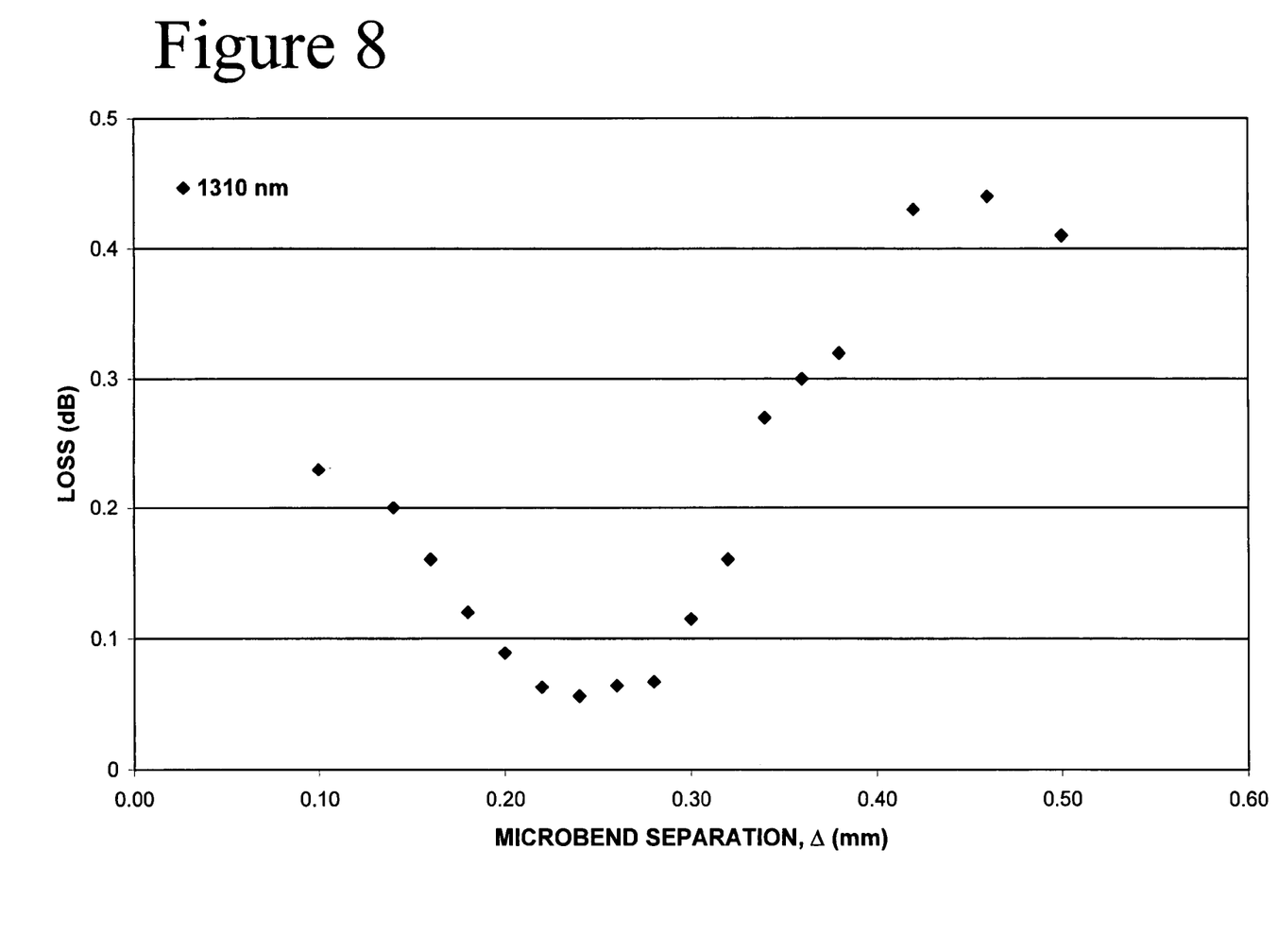
FIG. 8 depicts a graph of insertion loss plotted as a function of separation between microbends at a wavelength of 1310 nm for the fiber optic tap of FIG. 1.

FIGS. 7 and 8 show tap efficiency and insertion loss data, respectively, obtained at an operating wavelength of 1310 nm. The primary and secondary microbends were formed to have roughly equal coupling-strength and taken individually created a loss in the fiber of approximately 0.5 dB.

The data of FIG. 7 shows a clear peak in tap efficiency at a separation of 0.26 mm. According to the beat-length data of FIG. 6, this corresponds to one-half of the beat length at 1310 nm. At this separation, the secondary microbend 122 of FIG. 1 causes anti-resonant coupling of the LP11 mode back into the LP01 mode. The efficiency of the tap is thus improved since optical energy is radiated into the cladding by higher-order modes.

The coupling of the LP11 energy back into the LP01 mode is also reflected in the insertion loss data of FIG. 8, where a distinct minimum in the insertion loss is present at the same 0.26 mm separation.

Figure 9:
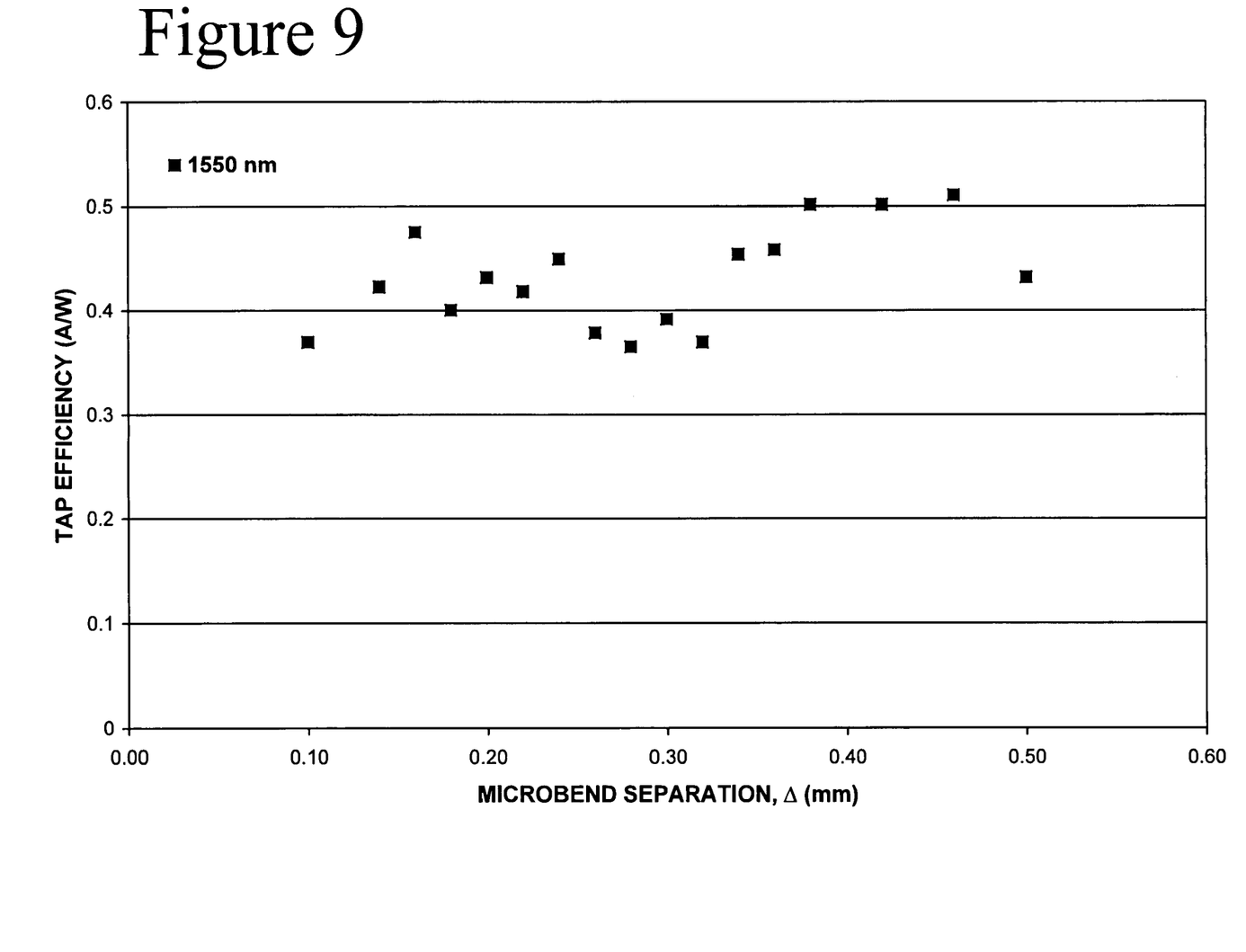
FIG. 9 depicts a graph of tap efficiency as a function of separation between microbends at a wavelength of 1550 nm for the fiber optic tap of FIG. 1.
Figure 10:
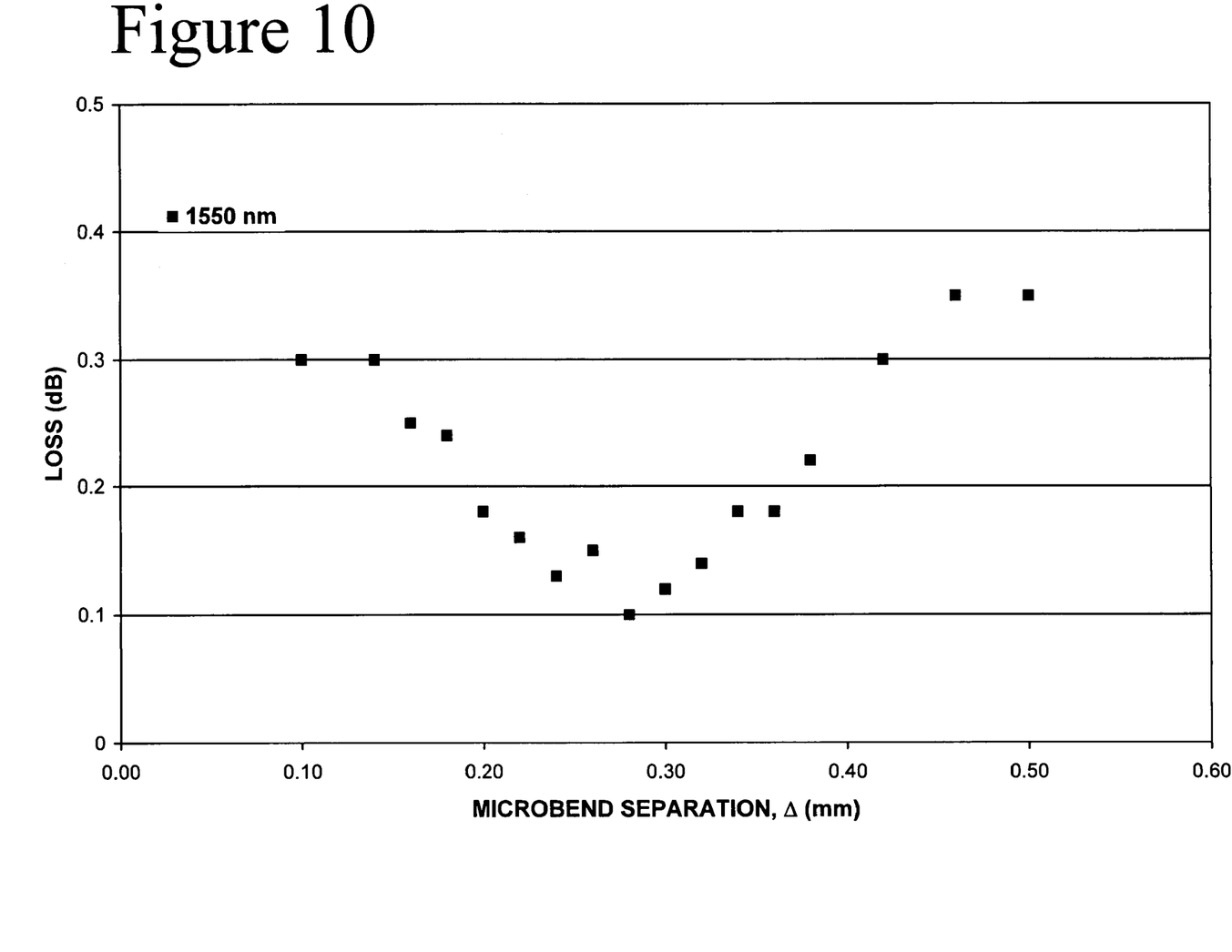
FIG. 10 depicts a graph of insertion loss plotted as a function of separation between microbends at a wavelength of 1550 nm for the fiber optic tap of FIG. 1.

FIGS. 9 and 10 show tap efficiency and insertion loss data, respectively, for the same taps taken at a wavelength of 1550 nm. Unlike the data for 1310 nm, the 1550 nm data in FIG. 9 does not show a peak in the tap efficiency. This results from the fact that 1550 nm is sufficiently far from cut-off that the LP11 mode radiates nearly as efficiently as the higher-order modes. The redistribution of power caused by anti-resonant coupling therefore has no effect. By contrast, the insertion loss data for 1550 nm shown in FIG. 10 shows a distinct dip in the insertion loss similar to the 1310 nm data indicating that LP11 mode power is being coupled back into the LP01 mode by the second microbend.

Figure 11:
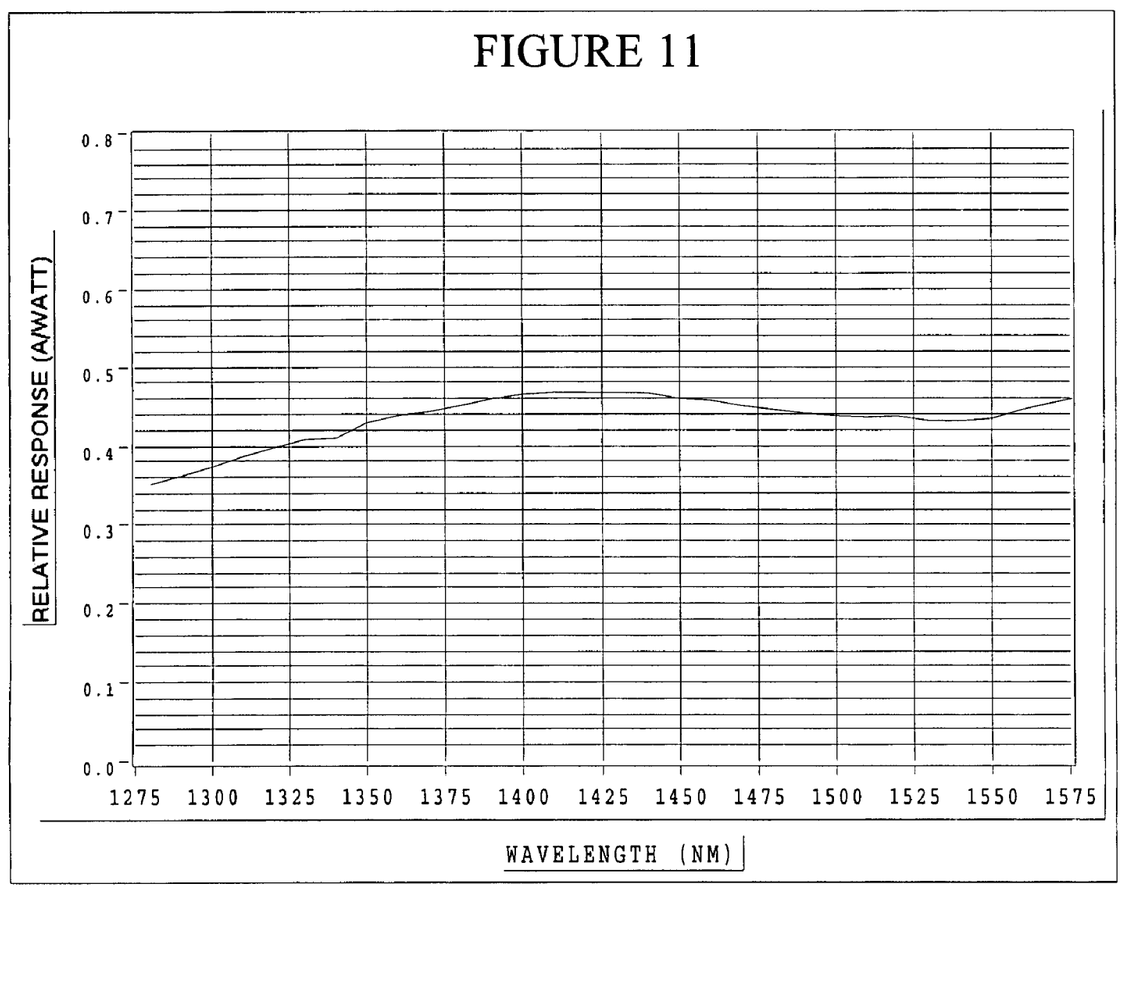
FIG. 11 depicts a graph of tap output signal plotted as a function of wavelength for the fiber optic tap of FIG. 1.

FIG. 11 shows relative response as a function of wavelength for an optical tap made using two microbends spaced 0.30 mm in Corning SMF28 fiber. The separation of 0.30 mm was chosen to optimize the flatness of the spectral shape while maintaining good tap efficiency at 1310 nm. The total loss of the tap was 0.10 dB at 1310 nm and 0.12 dB at 1550 nm. FIG. 11 shows substantial improvement in spectral flatness when compared to the spectral curve of FIG. 5 for a single-bend tap.

It should be noted that the teachings of the present invention could be applied to a variety of fiber types. For example, single-mode fiber with large core-cladding index differences, called high-NA fibers, are particularly difficult to form single-bend taps in owing to the tendency of the unguided LP11 mode to propagate without radiating its energy into the cladding.

Figure 12:
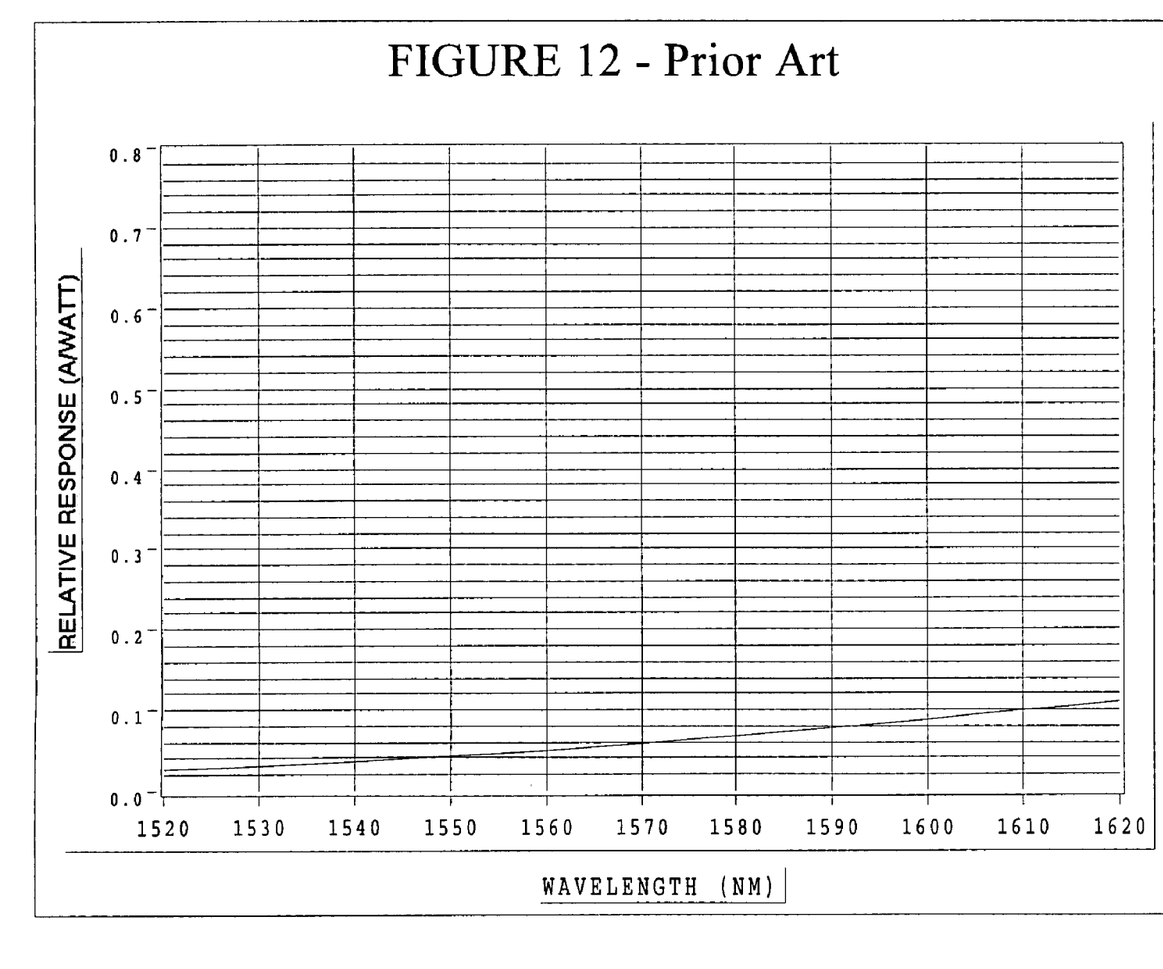
FIG. 12 depicts a graph of tap output signal plotted as a function of wavelength for a conventional single-bend optical fiber tap made in a High-NA fiber.
Figure 13:
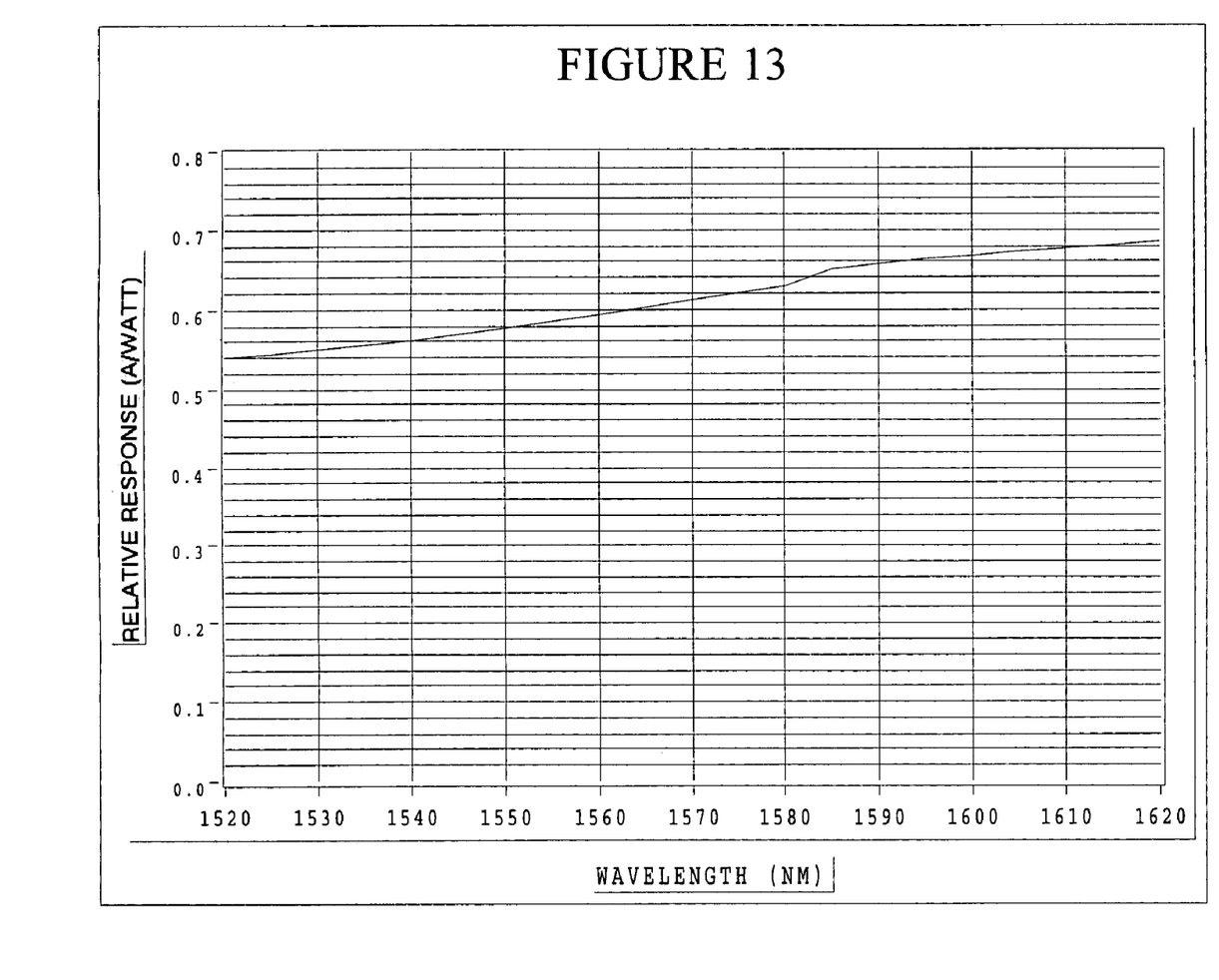
FIG. 13 depicts a graph of tap output signal plotted as a function of wavelength for a tap made in High NA fiber according to the present inventive teachings.

FIGS. 12 and 13 show spectral response of a taps made in high-NA fiber using the single-bend design of the prior art and my inventive double-bend design, respectively. The high-NA fiber used has cut-off wavelength of 1500 nm and core-cladding index difference of 0.0125. The intermodal beat-length between the LP01 and LP11 modes at 1550 nm in this fiber was calculated, using Eqs. (2) and (3) above, to be 0.25 mm. At this beat-length, the spacing for anti-resonant coupling in this fiber is approximately 0.125 mm.

This spacing was used to make the tap of FIG. 13. Both taps had measured loss of 0.1 dB at 1550 nm.

Comparison of FIGS. 12 and 13 shows that the tap efficiency is increased by more than a factor of 10 in the high-NA fiber using the inventive tap of FIG. 1 compared to the single-bend tap of the prior art. At the same time, the spectral flatness is greatly improved relative to the prior art.

Additional embodiments of the inventive optical tap 100 can be realized by using alternative methods for coupling light into the LP11 mode of the fiber as described in U.S. Pat. No. 6,535,671 B1. Among these are, e.g., offset fusion splices, tapering of the fiber and fiber gratings.

Although the descriptions given above contain many detailed specifications, these should not be construed as limitations on the scope of the invention but merely as illustrations of the invention. For example, a reflecting surface angled below the angle for total internal reflection could be used in order to create an optical tap that is highly polarization sensitive. Such taps would be useful for polarization sensors in fiber optic systems. Alternatively, thin-film coatings could be used on the reflecting surface 106 of FIG. 1 to provide a wide variety of wavelength dependencies in the sensitivity of the optical tap. Further, more than two microbends could be used in a given fiber, in which at least two of the microbends are spaced at or near one-half of the intermodal beat length.

What is claimed is:

1. A broadband fiber optic tap for efficiently transferring optical energy out of an optical fiber over a broad wavelength range, the tap comprising:
   an optical fiber containing a core and a cladding;
   a first structure formed in the fiber that transfers optical energy from a guided mode to a first unguided mode of said optical fiber;
   a second structure, formed in the fiber and situated at a pre-defined distance, Δ, in a direction of optical propagation downstream from said first structure, that transfers optical energy from said first unguided mode back into said guided mode and into a second unguided mode of said optical fiber, said second unguided mode being a higher-order mode than the first unguided mode; and
   a reflecting surface formed in the cladding of said optical fiber and situated at a pre-defined distance, d, in a direction of optical propagation downstream from said first structure for reflecting optical energy propagating in said cladding out of the side of said fiber.

2. The fiber optic tap in claim 1 wherein said distance Δ is approximately equal to one-half of an intermodal beat length for said guided mode and said first unguided mode.

3. The fiber optic tap in claim 1 wherein said reflecting surface is formed by ablating cladding material away with laser radiation.

4. The fiber optic tap in claim 1 wherein each of said first and second structures comprise an annealed microbend.

5. The fiber optic tap in claim 3 wherein said reflecting surface is positioned at an angle greater than or equal to 44 degrees relative to a perpendicular to a longitudinal axis of the optical fiber.

6. The fiber optic tap in claim 1 wherein said distance d is given by the following equation:

$$\frac{n_{clad}D}{NA} < d < \frac{2n_{clad}D}{NA}$$

where: $n_{clad}$ is an index of refraction of the cladding material,
D is a diameter of the fiber, and
NA is a numerical aperture of the fiber.

7. A fiber optic tap for transferring optical energy out of an optical fiber, the tap comprising:
   an optical fiber containing a core and a cladding;
   a first structure formed in the fiber that couples optical energy between at least two modes of said optical fiber;
   a second structure formed in the fiber and situated at a pre-defined distance from said first structure that couples optical energy between said two modes of said optical fiber; and
   a reflecting surface formed in the cladding of said optical fiber and situated at a pre-defined distance, d, in a direction of optical propagation downstream from said first structure for reflecting optical energy out of the side of said fiber;
   wherein said distance d is given by the following equation:

$$\frac{n_{clad}D}{NA} < d < \frac{2n_{clad}D}{NA}$$

where: $n_{clad}$ is an index of refraction of the cladding material,
D is a diameter of the fiber, and
NA is a numerical aperture of the fiber.

8. A fiber optic tap for transferring optical energy out of an optical fiber, the tap comprising:
   an optical fiber containing a core and a cladding;
   a first structure formed in the fiber that couples optical energy between at least two modes of said optical fiber; and
   a reflecting surface formed in the cladding of said optical fiber and situated at a pre-defined distance, d, in a direction of optical propagation downstream from said first structure for reflecting optical energy out of the side of said fiber;
   wherein said distance d is given by the following equation:

$$\frac{n_{clad}D}{NA} < d < \frac{2n_{clad}D}{NA}$$

where: $n_{clad}$ is an index of refraction of the cladding material,
D is a diameter of the fiber, and
NA is a numerical aperture of the fiber.

* * * * *